(12) United States Patent
Mitsuda et al.

(10) Patent No.: US 7,787,190 B2
(45) Date of Patent: Aug. 31, 2010

(54) OPTICAL ELEMENT AND IMAGING DEVICE

(75) Inventors: Yukihiro Mitsuda, Gifu (JP); Yukihiro Sano, Gifu (JP); Keita Kaifu, Tokyo (JP); Kazuhiro Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/565,925

(22) Filed: Sep. 24, 2009

(65) Prior Publication Data

US 2010/0079839 A1  Apr. 1, 2010

(30) Foreign Application Priority Data

Sep. 26, 2008  (JP) .............................. 2008-249240

(51) Int. Cl.
  *G02B 1/06*  (2006.01)
  *G02B 3/12*  (2006.01)

(52) U.S. Cl. ........................ 359/666; 359/665; 359/667

(58) Field of Classification Search .......... 359/665–667
See application file for complete search history.

(56) References Cited

U.S. PATENT DOCUMENTS 7,388,705 B2 *  6/2008  Onuki et al. ................ 359/665
7,545,430 B2 *  6/2009  Nakagawa ................... 359/666
2010/0046084 A1 *  2/2010  Kirita et al. ................. 359/666

FOREIGN PATENT DOCUMENTS

JP  2000-356792  12/2000

* cited by examiner

*Primary Examiner*—Evelyn A. Lester
(74) *Attorney, Agent, or Firm*—K&L Gates LLP

(57) ABSTRACT

An optical element includes a first liquid; a second liquid that is immiscible with the first liquid and that has polarity or electrical conductivity; a first substrate portion; a second substrate portion; a sidewall portion; a second electrode disposed on one of the second substrate portion and the sidewall portion; and an accommodating portion constituted by the first substrate portion, the second substrate portion, and the sidewall portion and sealing the first liquid and the second liquid therein. The optical element further includes a first film disposed on the first substrate portion side of the accommodating portion and having high affinity with the first liquid, a second film disposed on the second substrate portion side of the accommodating portion and having high affinity with the second liquid, and a third film disposed at the center of the second film and having high affinity with the first liquid.

8 Claims, 14 Drawing Sheets

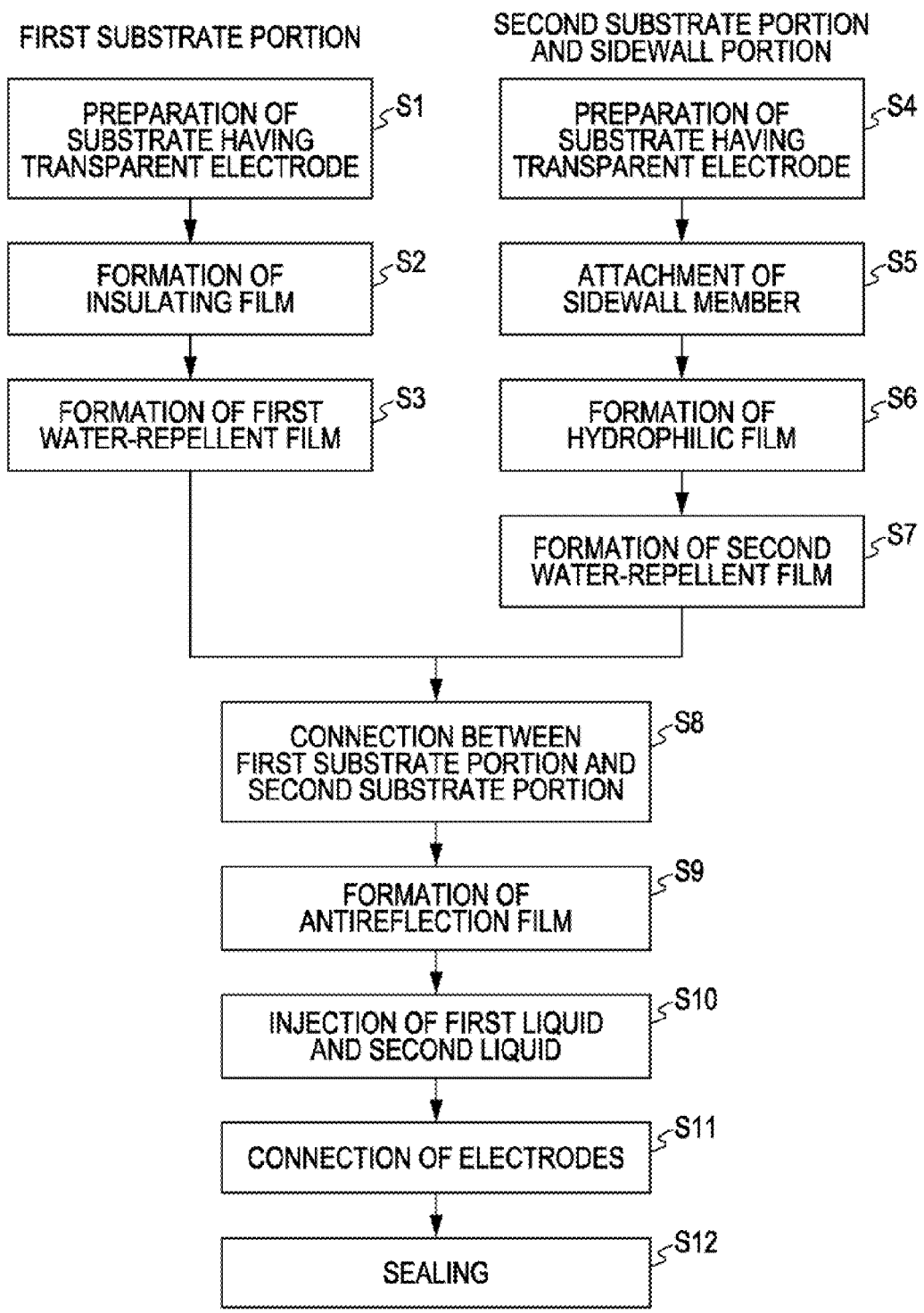

OPTICAL ELEMENT AND IMAGING DEVICE

CROSS REFERENCES TO RELATED APPLICATIONS

The present application claims priority to Japanese Priority Patent Application JP 2008-249240 filed in the Japan Patent Office on Sep. 26, 2008, the entire content of which is hereby incorporated by reference.

BACKGROUND

The present application relates to an optical element and an imaging device. More specifically, the present application relates to an optical element utilizing an electrowetting phenomenon and an imaging device including the same.

In imaging optical systems used in imaging devices such as a still camera and a video camera, it is necessary for such imaging optical systems to have functions of adjusting the focus and adjusting the amount of light, to realize natural defocusing, to make the distribution of the amount of light on an image surface to be uniform etc. Among these requirements, in general, the requirement for adjusting the amount of light is met by a mechanical aperture mechanism including a plurality of movable blades.

However, such a mechanical aperture mechanism has the following problems: A mechanical driving unit for driving the movable blades is necessary, and thus the size of the device increases. In addition, in a small aperture state in which an opening of the aperture mechanism is small, diffraction of a light beam occurs, thereby decreasing the resolution of an acquired image. Furthermore, a sound is generated during the operation of the aperture mechanism.

To solve the above problems in such a mechanical aperture mechanism, optical elements using an electrocapillarity (electrowetting phenomenon) have been proposed (refer to, for example, Japanese Unexamined Patent Application Publication No. 2000-356792 (document '792)). FIG. 18 is a schematic view of an optical element disclosed in document '792. An optical element 100 described in document '792 is an optical element configured to control the amount of light beam 30 passing through the element (the amount of transmitted light).

The optical element 100 is configured so that a transparent substrate 102 and a transparent cover plate 106 are liquid-tightly sealed on a lower opening and an upper opening, respectively, of a cylindrical container 105 by adhesion or the like. A transparent electrode 103, an insulating layer 104, and a water-repellent film 111 are provided on the inner surface of the transparent substrate 102 in that order. A hydrophilic film 113 is provided on the inner surface of the transparent cover plate 106. A rod-shaped electrode 125 is provided so as to penetrate through the container 105, and an end of the rod-shaped electrode 125 is in contact with a first liquid 121. The first liquid 121 and a second liquid 122 are hermetically sealed in a space constituted by the hydrophilic film 113, the water-repellent film 111, and the inner wall of the container 105. The first liquid 121 is a liquid having electrical conductivity or polarity, and the second liquid 122 is a liquid that is immiscible with the first liquid 121. The refractive index of the first liquid 121 is substantially the same as the refractive index of the second liquid 122, but the transmittance of the first liquid 121 is different from the transmittance of the second liquid 122.

According to the optical element 100 described in document '792, a voltage is applied between the transparent electrode 103 and the rod-shaped electrode 125, and thus the shape of the interface between the two liquids is changed through the electrowetting phenomenon. As a result, a part of the surface of the second liquid 122 on the hydrophilic film 113 side contacts the hydrophilic film 113 to form on the hydrophilic film 113 an opening through which light can be transmitted (to form an optical path in the optical element 100). In this optical element 100, the size of the opening formed on the hydrophilic film 113 is changed by changing the voltage applied, thus adjusting the amount of light beam 30 passing through the optical element 100. That is, according to this optical element 100, the amount of light can be electrically controlled, and thus it is possible to solve the shortcomings of the mechanical aperture mechanism described above.

SUMMARY

In the optical element using an electrowetting phenomenon, decentration of an opening provided on the light-incident side readily occurs, and the amount of decentration is also large. In such a case, a problem of decreasing the resolution occurs. To solve this problem, in document '792, the transparent electrode 103 is formed such that the shape of the transparent electrode 103 is a concave shape when viewed from the liquid side. However, this structure causes a problem that it is difficult to reduce the thickness of the optical element 100. Furthermore, in the optical element 100 described in document '792, since the transparent electrode 103 is formed so as to have a concave shape viewed from the liquid side, the structure of the optical element 100 becomes complex and it is difficult to make the optical element 100 and to reduce the size of the optical element 100.

In an optical element using an electrowetting phenomenon, it is desirable to suppress decentration of an opening with a simpler structure.

An optical element according to an embodiment includes a first liquid and a second liquid that is immiscible with the first liquid and that has polarity or electrical conductivity. The optical element according to an embodiment further includes a first substrate portion, a second substrate portion, a sidewall portion, a second electrode disposed on one of the second substrate portion and the sidewall portion, and an accommodating portion constituted by the first substrate portion, the second substrate portion, and the sidewall portion and sealing the first liquid and the second liquid therein. The first substrate portion includes a first substrate having optical transparency, a first electrode disposed on a surface of the first substrate and having optical transparency, and an insulating film disposed on the first electrode and having optical transparency. Furthermore, the first substrate portion includes a first film disposed on the insulating film and having higher affinity with the first liquid than with the second liquid and optical transparency. The second substrate portion includes a second substrate having optical transparency, a second film disposed on a surface of the second substrate and having higher affinity with the second liquid than with the first liquid and optical transparency, and a third film disposed at the center of the second film and having higher affinity with the first liquid than with the second liquid and optical transparency. The sidewall portion connects the first substrate portion to the second substrate portion so that the first film and the second film face each other.

An imaging device according to an embodiment includes the optical element according to an embodiment, a power supply unit configured to apply a voltage between the first electrode and the second electrode of the optical element, a lens unit configured to focus incident light, and an imaging element on which the light is focused through the optical element and the lens unit.

In an embodiment, the third film having higher affinity with the first liquid than with the second liquid is provided at the center of the second film of the second substrate portion. Therefore, in the case where no voltage is applied, the first liquid is fixed by being in contact with not only the first film of the first substrate portion but also the third film of the second substrate portion. Accordingly, a contact area between the first liquid and a film on the second substrate portion side of the accommodating portion is formed on the third film or in an area centering on the third film.

In an embodiment, the third film having higher affinity with the first liquid than with the second liquid is provided at the center of the second film of the second substrate portion. This structure can suppress a shift of the center of a contact area between the first liquid and a film of the accommodating portion on the second substrate portion side from the optical axis. That is, according to the embodiment, decentration of the contact area between the first liquid and the film of the accommodating portion on the second substrate portion side can be suppressed with a simpler structure.

When the optical element according to an embodiment is applied to an aperture mechanism (iris) of an imaging device or the like, the above-mentioned contact area functions as an opening through which light is transmitted. Accordingly, in such a case, decentration of the opening can be suppressed with a simpler structure.

Additional features and advantages are described herein, and will be apparent from the following Detailed Description and the figures.

BRIEF DESCRIPTION OF THE FIGURES

FIG. 5 is a flowchart showing a procedure for making the liquid iris of the first embodiment;

DETAILED DESCRIPTION

The present application will now be described with reference to the drawings according to an embodiment. As described below, optical elements according to embodiments will be described using an aperture mechanism (iris) used in an imaging device as an example. Note that embodiments are not limited to examples described below.

First Embodiment

Structure of Imaging Device

Figure 1:
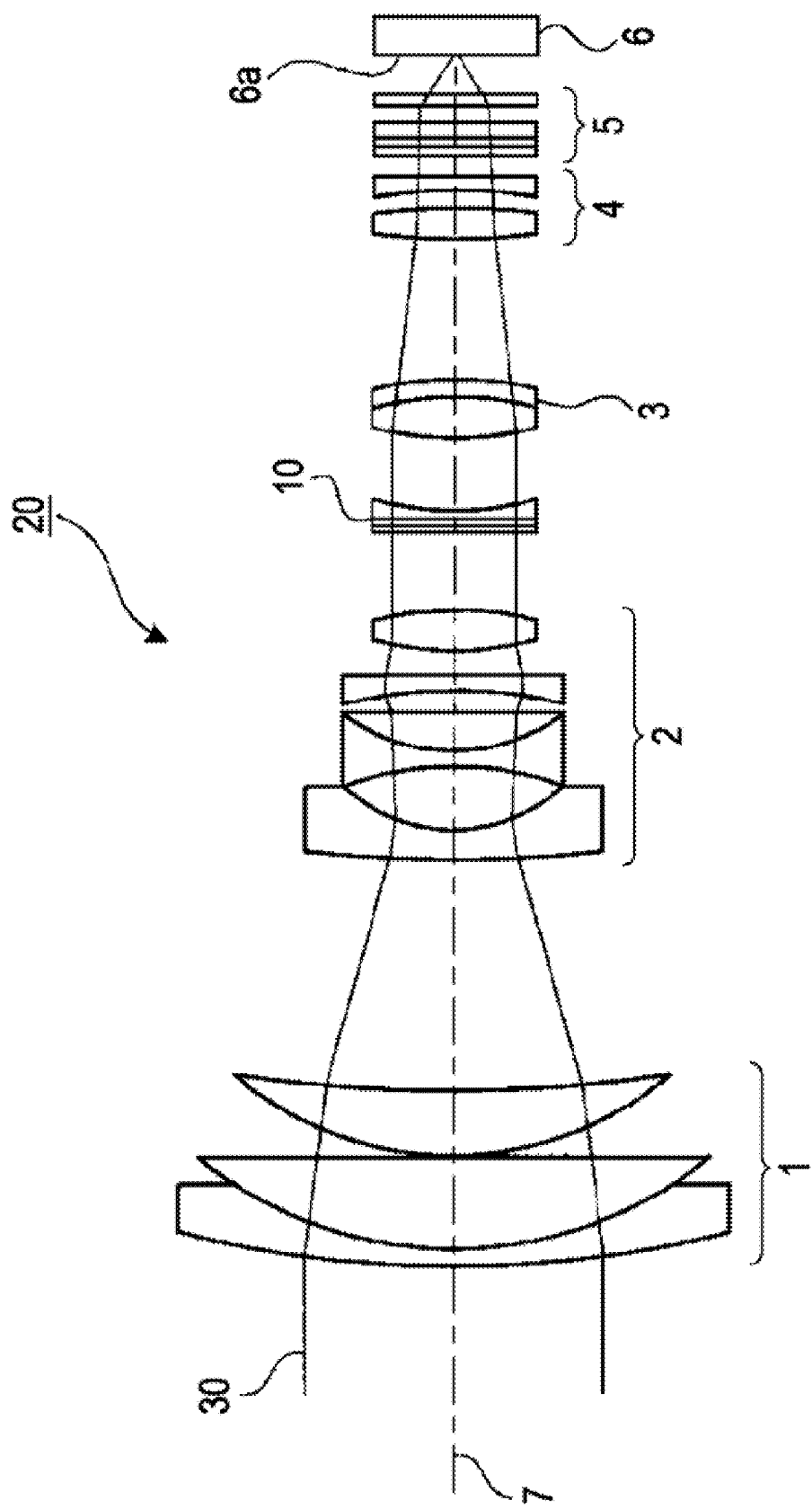
FIG. 1 is a schematic view of an imaging device according to a first embodiment.

FIG. 1 shows an example of the schematic structure of an imaging device to which an aperture mechanism (hereinafter referred to as "liquid iris") of this embodiment is applied. FIG. 1 shows an example of an imaging device including a zoom mechanism. FIG. 1 mainly shows the structure of an optical system of the imaging device, and the structures of a portion configured to process an acquired image and a portion configured to perform a control process of the optical system are omitted. The embodiment can be applied also to an imaging device that does not include a zoom mechanism.

An optical system of an imaging device 20 includes a first lens unit 1, a second lens unit 2, a liquid iris 10, a third lens unit 3, a fourth lens unit 4, a filter 5, and an imaging element 6. The first lens unit 1, the second lens unit 2, the liquid iris 10, the third lens unit 3, the fourth lens unit 4, the filter 5, and the imaging element 6 are arranged in that order from the incident side of a light beam 30.

Among the first lens unit 1 to the fourth lens unit 4 for focusing incident light, the first lens unit 1 and the third lens unit 3 are attached so as to be fixed in a lens barrel (not shown). The second lens unit 2 is a lens unit for zooming and is attached to the lens barrel so as to move in a direction of an optical axis 7. The fourth lens unit 4 is a lens unit for focusing and is attached so as to move in the direction of the optical axis 7. The movement of the second lens unit 2 (for zooming) and the fourth lens unit 4 (for focusing) in the direction of the optical axis 7 is controlled by a control unit (not shown) in the imaging device 20.

The liquid iris 10 (optical element) adjusts an opening diameter (aperture diameter) of the liquid iris 10 at the light-incident side by utilizing an electrowetting phenomenon, whereby adjusting the amount of light beam 30 passing through the liquid iris 10. The opening diameter (aperture diameter) of the liquid iris 10 at the light-incident side is adjusted by changing the value of voltage applied to the liquid iris 10, and this adjustment is controlled by the control unit (not shown) in the imaging device 20. The specific structure and the operation of the liquid iris 10 will be described in detail below.

The filter 5 is constituted by an infrared cut filter, a low-pass filter, or the like. The imaging element 6 is constituted by, for example, charge coupled devices (CCD) or complementary metal oxide semiconductors (CMOS).

In the imaging device 20 of this embodiment, as shown in FIG. 1, the light beam 30 incident from the first lens unit 1 side is focused on an imaging surface 6a of the imaging element 6 through the above-mentioned various optical elements. An image data acquired in the imaging element 6 is subjected to a predetermined process by an image-processing unit (not shown) in the imaging device 20.

[Structure of Liquid Iris]

Figure 2A:
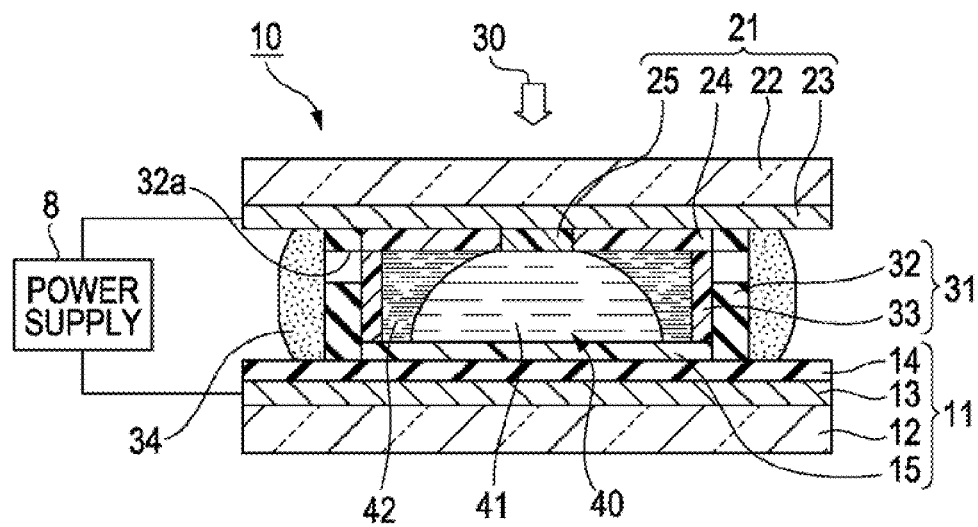
FIG. 2A is a schematic cross-sectional view of a liquid iris according to the first embodiment.
Figure 2B:
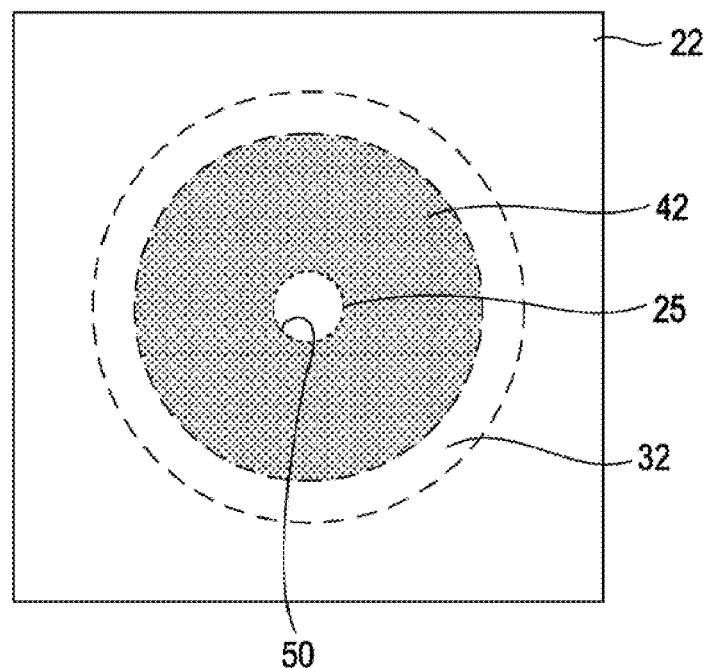
FIG. 2B is a top view of the liquid iris shown in FIG. 2A, viewed from the light-incident side.

FIGS. 2A and 2B show the schematic structure of the liquid iris 10 of this embodiment. FIG. 2A is a schematic cross-sectional view of the liquid iris 10 when no voltage is applied (hereinafter, this state is also referred to as "static state"), and FIG. 2B is a top view of the liquid iris 10 viewed from the light-incident side at that time.

The liquid iris 10 includes a first substrate portion 11, a second substrate portion 21, and a sidewall portion 31 connecting the first substrate portion 11 to the second substrate portion 21. A first liquid 41 and a second liquid 42 are hermetically enclosed in an accommodating chamber 40 (accommodating portion) constituted by the first substrate portion 11, the second substrate portion 21, and the sidewall portion 31.

As the first liquid 41, a liquid that has an insulating property or nonpolarity, and that has optical transparency is used. Any liquid having such properties can be used as the first liquid 41. For example, silicone oil is used as the first liquid 41. There are various types of commercially available silicone oil having different specific gravities and refractive indices. Accordingly, when silicone oil is used as the first liquid 41, among various types of commercially available silicone oil, silicone oil having substantially the same specific gravity and refractive index as those of the second liquid 42 described below is selected and used as the first liquid 41.

On the other hand, as the second liquid 42, a liquid that is immiscible with the first liquid 41, that has substantially the same specific gravity and refractive index as those of the first liquid 41, and that has polarity or electrical conductivity is used. Any liquid having such properties can be used as the second liquid 42. For example, when silicone oil is used as the first liquid 41, water (specific gravity: 1, refractive index: 1.333) can be used as the second liquid 42. In this case, instead of water, a mixed liquid of water and ethanol, a mixed liquid of water, ethanol, and ethylene glycol, a mixed liquid prepared by adding common salt to a mixed liquid of water and ethanol, or the like can also be used. In this embodiment, in order to make optical transparency of the second liquid 42 lower than that of the first liquid 41 (in order to decrease optical transparency of the second liquid 42), the second liquid 42 (e.g., water) is colored by mixing carbon black or the like. A dye other than carbon black may be used as a colorant.

Furthermore, in order to make the specific gravity and the refractive index of the second liquid 42 to be closer to those of the first liquid 41, for example, a liquid prepared by mixing ethanol, ethylene glycol, common salt etc. with water is used as the second liquid 42, and the specific gravity and the refractive index of the second liquid 42 may be controlled by adjusting the mixing ratio of these. By adjusting the refractive index of the second liquid 42 to be substantially the same as the refractive index of the first liquid 41, refraction of light (lens effect) at the interface between the first liquid 41 and the second liquid 42 can be prevented or sufficiently decreased, thereby performing the operation of an aperture of the liquid iris 10 more reliably. Furthermore, by adjusting the specific gravity of the second liquid 42 to be substantially the same as the specific gravity of the first liquid 41, a change in the shape of the interface between the first liquid 41 and the second liquid 42 can be suppressed when the whole device is vibrated or tilted. Note that it is sufficient that the values of the specific gravity and refractive index of the second liquid 42 are close to those of the first liquid 41 to an extent that optical properties, a vibration resistance property etc. of the device are within allowable tolerances of the device.

The first substrate portion 11 includes a first substrate 12, a first electrode 13 disposed on the first substrate 12, an insulating film 14 disposed on the first electrode 13, and a first water-repellent film 15 disposed on the insulating film 14.

The first substrate 12 is a square plate-shaped member composed of a light-transmissive material such as transparent glass and having a thickness of, for example, about 0.2 to 0.3 mm. Alternatively, a transparent synthetic resin material may be used as the material of the first substrate 12. The first electrode 13 is a transparent electrode composed of indium tin oxide (ITO) or the like. The first electrode 13 is connected to a terminal of a power supply 8 of the imaging device 20. The insulating film 14 is a dielectric film composed of polyvinylidene chloride, polyvinylidene fluoride, or the like.

The first water-repellent film 15 (first film) is a thin film (hydrophobic or lipophilic thin film) having higher affinity with the first liquid 41 (nonpolar liquid) than with the second liquid 42 (polar liquid). That is, the wettability of the first liquid 41 on the first water-repellent film 15 is larger than the wettability of the second liquid 42 on the first water-repellent film 15. In this embodiment, a fluorocarbon resin or the like is used as a material of the first water-repellent film 15. Any thin film having lipophilicity and optical transparency may be used as the first water-repellent film 15.

The second substrate portion 21 includes a second substrate 22, a second electrode 23 disposed on the second substrate 22, a hydrophilic film 24 disposed on the second electrode 23, and a second water-repellent film 25 disposed at the center of the hydrophilic film 24.

As in the first substrate 12, the second substrate 22 is a square plate-shaped member composed of a light-transmissive material such as transparent glass and having a thickness of, for example, about 0.2 to 0.3 mm. As in the first electrode 13, the second electrode 23 is a transparent electrode composed of ITO or the like. The second electrode 23 is connected to another terminal of the power supply 8 of the imaging device 20.

The hydrophilic film 24 (second film) is a thin film having higher affinity with the second liquid 42 (polar liquid) than with the first liquid 41 (nonpolar liquid). That is, the wettability of the second liquid 42 on the hydrophilic film 24 is larger than the wettability of the first liquid 41 on the hydrophilic film 24. In this embodiment, a polyvinyl alcohol resin, a polyacrylic acid resin, or the like is used as a material of the hydrophilic film 24. Any thin film having hydrophilicity and optical transparency may be used as the hydrophilic film 24.

As in the first water-repellent film 15, the second water-repellent film 25 (third film) is a thin film (lipophilic thin film) having higher affinity with the first liquid 41 (nonpolar liquid) than with the second liquid 42 (polar liquid). In this embodiment, the same material as the first water-repellent film 15 is used as a material of the second water-repellent film 25. Note that the material constituting the second water-repellent film 25 may be the same as or different from the material constituting the first water-repellent film 15.

The surface of the second water-repellent film 25 at the accommodating chamber 40 side is circular in shape (see FIG. 2B). The embodiment is not limited thereto, and the surface of the second water-repellent film 25 may have a shape other than a circular shape. However, as described below, in this embodiment, an opening 50 that transmits light expands centering on the second water-repellent film 25. In this case, the planar shape of the opening 50 is preferably a circular shape in consideration of the resolution. Therefore, in order to maintain the planar shape of the opening 50 to be a circular shape, the surface of the second water-repellent film 25 is preferably circular in shape.

In this embodiment, since the second water-repellent film 25 having higher affinity with the first liquid 41 than with the second liquid 42 is provided at the center of the hydrophilic film 24, as shown in FIG. 2A, a part of the first liquid 41 contacts the second water-repellent film 25 even in the static state. As a result, as shown in FIG. 2B, the opening 50 is formed at the light-incident side even in the static stare. Accordingly, in order to increase the range of a change in the diameter of the opening 50, the diameter of the opening 50 in the static state is preferably as small as possible. That is, the diameter of the second water-repellent film 25 is preferably as small as possible.

Furthermore, preferably, the thickness of the second water-repellent film 25 is substantially the same as the thickness of the hydrophilic film 24. Specifically, it is preferable that a surface of the second water-repellent film 25 on the accommodating chamber 40 side be flush with a surface of the hydrophilic film 24 on the accommodating chamber 40 side. The reason for this is as follows. If the thickness of the second water-repellent film 25 is different from the thickness of the hydrophilic film 24, and a difference in level is generated on the surface at the accommodating chamber 40 side, optical properties are changed by the portion including the difference in level and thus it is difficult to obtain desired optical properties. Furthermore, from the standpoint of the optical properties of the liquid iris 10, materials of the hydrophilic film 24 and the second water-repellent film 25 are preferably selected so that the refractive index of the hydrophilic film 24 is as close to the refractive index of the second water-repellent film 25 as possible. Note that it is sufficient that the values of the thickness and the refractive index of the hydrophilic film 24 are close to those of the second water-repellent film 25 to an extent that optical properties of the device are within allowable tolerances of the device.

The sidewall portion 31 includes a cylindrical sidewall member 32 and a hydrophilic film 33 provided on the inner wall surface of the sidewall member 32.

The sidewall member 32 is a cylindrical member composed of an insulating material (such as glass). In this embodiment, the sidewall member 32 has an inner diameter of about 9 mm, an outer diameter of about 11 mm, and a height of about 1 mm. The sidewall member 32 includes an inlet 32a for injecting the first liquid 41 and the second liquid 42 into the liquid iris 10. The inlet 32a is sealed from the outside of the sidewall member 32 using an adhesive member 34.

The hydrophilic film 33 (fourth film) is a thin film having higher affinity with the second liquid 42 (polar liquid) than with the first liquid 41 (nonpolar liquid). In this embodiment, as in the hydrophilic film 24 of the second substrate portion 21, a polyvinyl alcohol resin, a polyacrylic acid resin, or the like is used as a material of the hydrophilic film 33. Any thin film having hydrophilicity and optical transparency may be used as the hydrophilic film 33.

An alternating-current power supply is used as the power supply 8 (power supply unit) of the imaging device 20 to which the first electrode 13 and the second electrode 23 are connected. A direct-current power supply may also be used as the power supply 8. However, in such a case, when the power supply is set to the off-state from a voltage-applied state, electrical charges are somewhat left on the insulating film 14. Accordingly, the speed of an operation for which the first liquid 41 is returned to the original static state becomes somewhat lower than the case where an alternating-current power supply is used. Therefore, an alternating-current power supply is more preferably used as the power supply 8.

[Principle of Suppression of Decentration]

A description will be made of the principle of suppressing decentration of the opening 50 in the liquid iris 10 of this embodiment. In the liquid iris 10 of this embodiment, in the case where no voltage is applied between the first electrode 13 and the second electrode 23 (in the static state), the interface between the first liquid 41 and the second liquid 42 is in the state shown in FIG. 2A.

More specifically, the first water-repellent film 15 is provided over the entire surface of the accommodating chamber 40 on the first substrate portion 11 side, and thus the first liquid 41 having higher wettability on the first water-repellent film 15 spreads over and contacts the first water-repellent film 15. In addition, the second water-repellent film 25 is provided at the center of the surface of the accommodating chamber 40 on the second substrate portion 21 side. Accordingly, a part of the surface of the first liquid 41 on the second substrate portion 21 side contacts the second water-repellent film 25. Specifically, in this embodiment, in the accommodating chamber 40, the first liquid 41 is fixed to the first water-repellent film 15 on the first substrate portion 11 side and the second water-repellent film 25 on the second substrate portion 21 side.

On the other hand, the second liquid 42 is disposed so as to contact the hydrophilic film 24 provided on the second substrate portion 21 side of the accommodating chamber 40 and the hydrophilic film 33 provided on the sidewall portion 31 side thereof and to surround the first liquid 41.

The interface between the first liquid 41 and the second liquid 42 has a spherical shape. This shape is determined by the balance of the surface tensions of the first liquid 41 and the second liquid 42, and the interfacial tensions on the first water-repellent film 15. The first liquid 41 spread on the first water-repellent film 15 close to the sidewall portion 31 as shown in FIG. 2A. However, since the hydrophilic film 33 is provided on the sidewall portion 31 side of the accommodating chamber 40, the first liquid 41 does not contact the sidewall portion 31.

As described above, a part of the first liquid 41 is fixed to the second water-repellent film 25 provided on the second substrate portion 21 side. Since the second water-repellent film 25 is disposed at the center of the hydrophilic film 24, the center of the second water-repellent film 25 is located at substantially the same position as the optical axis. Accordingly, the center position of a contact area between the first liquid 41 and the second water-repellent film 25, i.e., the center position of the opening 50 formed on the light-incident side (second substrate portion 21 side) of the liquid iris 10 is substantially disposed on the optical axis, thus suppressing decentration.

Figure 3A:
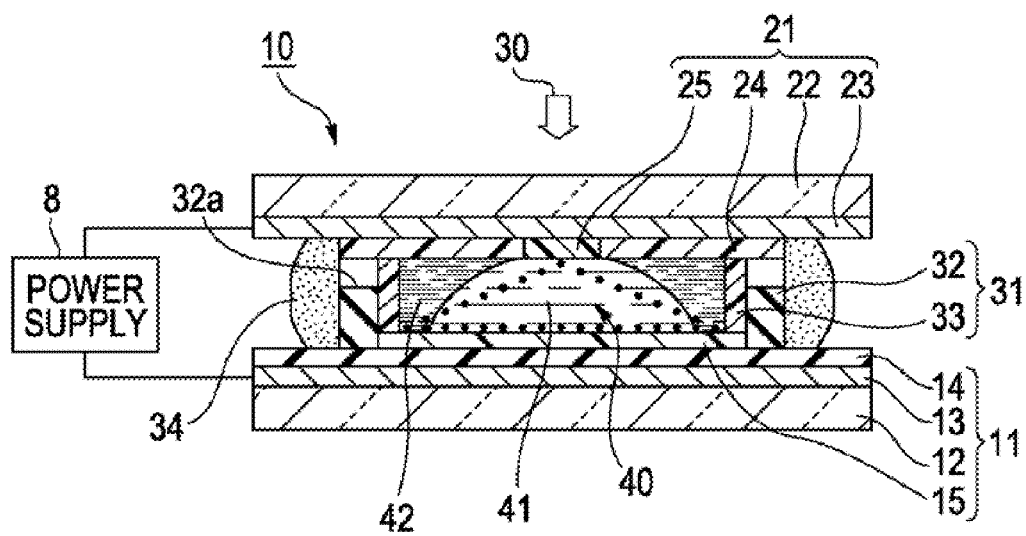
FIG. 3A is a schematic cross-sectional view of a liquid iris in the static state.
Figure 3B:
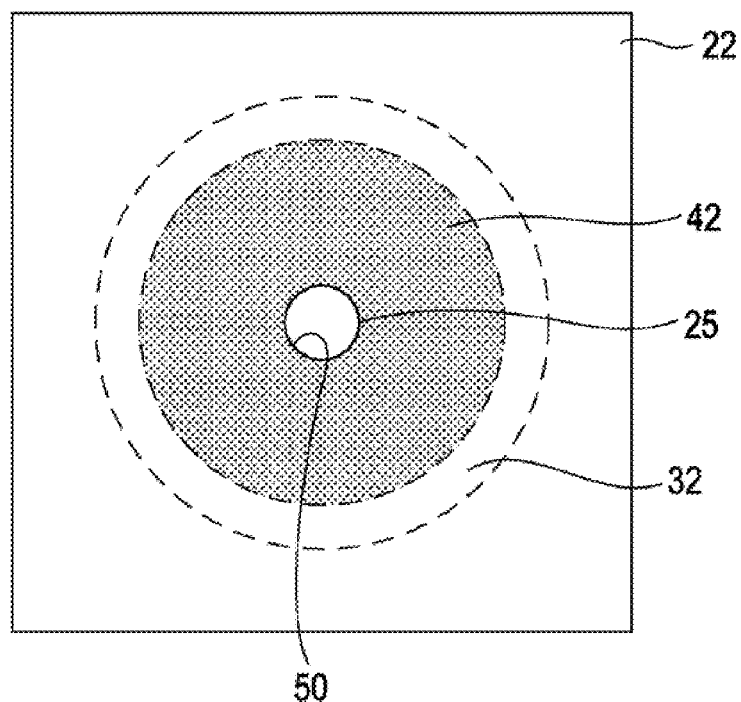
FIG. 3B is a top view of the liquid iris shown in FIG. 3A in the static state, viewed from the light-incident side.

As described above, in this embodiment, by utilizing not only the affinity between the first water-repellent film 15 and the first liquid 41 but also the affinity between the second water-repellent film 25 and the first liquid 41, decentration of the first liquid 41, i.e., decentration of the opening 50 is suppressed. More specifically, a three-dimensional control of decentration suppression can be performed in this embodiment. FIGS. 3A and 3B illustrate this feature.

FIG. 3A is a schematic cross-sectional view of the liquid iris 10 in the static state, and FIG. 3B is a top view of the liquid iris 10 in the static state viewed from the light-incident side. In FIG. 3A, a concept of the three-dimensional control of decentration suppression of the liquid iris 10 of this embodiment is represented by the black dots.

Figure 4A:
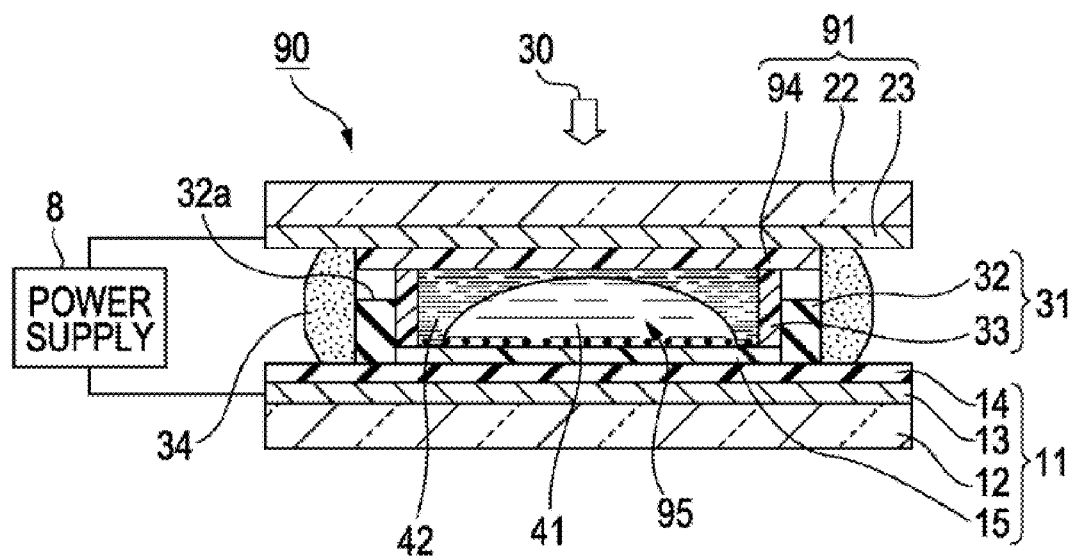
FIG. 4A is a schematic cross-sectional view of a liquid iris of a comparative example in the static state.
Figure 4B:
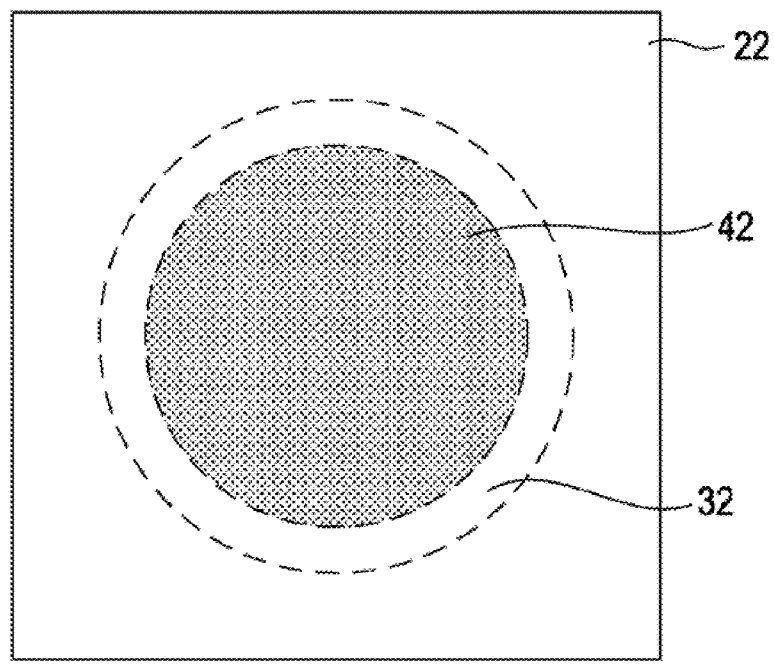
FIG. 4B is a top view of the liquid iris of the comparative example shown in FIG. 4A in the static state, viewed from the light-incident side.

For comparison, FIGS. 4A and 4B show a concept of decentration suppression in a liquid iris 90 (comparative example) that does not include the second water-repellent film 25. FIG. 4A is a schematic cross-sectional view of the liquid iris 90 of the comparative example in the static state, and FIG. 4B is a top view of the liquid iris 90 of the comparative example in the static state, viewed from the light-incident side. In the comparative example, decentration is suppressed by utilizing only the affinity between the first water-repellent film 15 and the first liquid 41, and thus a two-dimensional control of decentration suppression is performed (see black dots in FIG. 4A). Accordingly, in the liquid iris 90 of the comparative example, the effect of suppressing decentration is smaller than that of the present embodiment.

As described above, in this embodiment, the second water-repellent film 25 having higher affinity with the first liquid 41 than with the second liquid 42 is provided at the center of the hydrophilic film 24 on the light-incident side of the liquid iris 10. Accordingly, decentration suppression can be three-dimensionally controlled to increase the effect of suppressing decentration.

Furthermore, in this embodiment, since the second water-repellent film 25 having higher affinity with the first liquid 41 than with the second liquid 42 is provided at the center of the hydrophilic film 24, the second liquid 42 is repelled by the second water-repellent film 25. Accordingly, a black residue (stain) is eliminated in the opening 50, thus increasing the light transmittance.

Figure 18:
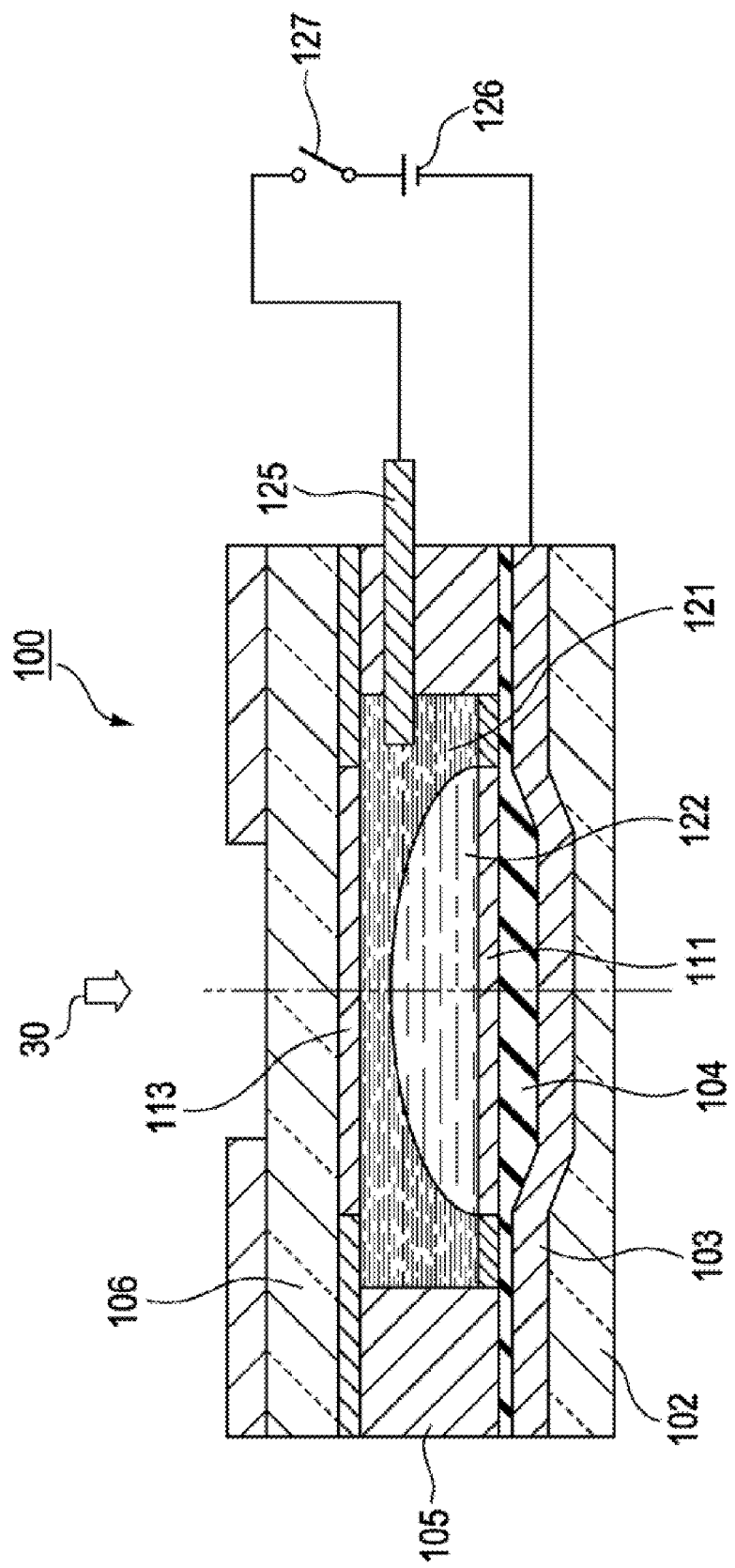
FIG. 18 is a schematic cross-sectional view of an optical element in the related art.

Furthermore, in this embodiment, decentration is suppressed by a simple structure in which the second water-repellent film 25 is provided at the center of the hydrophilic film 24. In addition, the electrode in the liquid iris 10 of this embodiment is flat, which is different from the concave electrode of the optical element (see FIG. 18) disclosed in document '792. Accordingly, the liquid iris 10 of this embodiment has a simple structure as compared with that disclosed in document '792, and thus the thickness of the liquid iris 10 can be reduced.

[Method of Making Liquid Iris]

Next, a method of making the liquid iris 10 of this embodiment will now be described with reference to FIG. 5. FIG. 5 is a flowchart showing a procedure for making the liquid iris 10.

First, a first substrate 12 composed of a light-transmissive material such as transparent glass is prepared. Next, a first electrode 13 composed of a light-transmissive electrically conductive material (e.g., ITO) is formed on a surface of the first substrate 12 by a vapor deposition method or the like so as to have a film thickness of about 30 nm (Step S1). Next, a dielectric film composed of polyvinylidene chloride, polyvinylidene fluoride, or the like and having a thickness in the range of, for example, about 1 to 5 μm is, for example, bonded onto the first electrode 13 with an adhesive to form an insulating film 14 (Step S2).

Next, a fluorocarbon resin or the like is applied onto the insulating film 14 by a spin-coating method or the like and baked at, for example, 150° C. to form a first water-repellent film 15 having a thickness in the range of about 10 to 30 nm (Step S3). A first substrate portion 11 is prepared by Steps S1 to S3 described above.

In addition, a second substrate portion 21 and a sidewall portion 31 are prepared as follows in parallel with Steps S1 to S3. First, a second substrate 22 composed of a light-transmissive material such as transparent glass is prepared. Next, a second electrode 23 composed of a light-transmissive electrically conductive material (e.g., ITO) is formed on a surface of the second substrate 22 by a vapor deposition method or the like so as to have a film thickness of about 30 nm (Step S4).

Next, a sidewall member 32 is bonded onto the second electrode 23 using, for example, a UV-curable adhesive (Step S5). Next, a polyvinyl alcohol resin, a polyacrylic acid resin, or the like is applied onto the second electrode 23 and the inner wall of the sidewall member 32 by a spin-coating method or the like to form a hydrophilic film 24 and a hydrophilic film 33, respectively, each having a thickness in the range of about 300 to 600 nm (Step S6).

Next, a second water-repellent film 25 is formed at the center of the hydrophilic film 24 (Step S7). In this step, the thickness of the second water-repellent film 25 is controlled to be substantially the same as the thickness of the hydrophilic film 24. The second water-repellent film 25 can be formed by the following method. First, the hydrophilic film 24 is formed on the entire surface of the second electrode 23. Next, an area of the hydrophilic film 24 other than a portion where the second water-repellent film 25 is to be formed is masked. Next, the portion of the hydrophilic film 24 where the second water-repellent film 25 is to be formed is removed by an etching method or the like. A fluorocarbon resin or the like is then applied onto the portion from which the hydrophilic film 24 has been removed, thus forming the second water-repellent film 25. Alternatively, the following method may be employed. First, a portion of the second electrode 23 where the second water-repellent film 25 is to be formed is masked, and a polyvinyl alcohol resin, a polyacrylic acid resin, or the like is applied thereon by a spin-coating method or the like to form the hydrophilic film 24. Next, the hydrophilic film 24 is masked, and a fluorocarbon resin or the like is then applied thereon to form the second water-repellent film 25.

The second substrate portion 21 and the sidewall portion 31, and a member produced by connecting the second substrate portion 21 to the sidewall portion 31 are prepared by Steps S4 to S7 described above.

Next, the first substrate portion 11 and the member produced by connecting the second substrate portion 21 to the sidewall portion 31, which are prepared as described above, are bonded to each other using, for example, a UV-curable adhesive (Step S8). In this step, the first substrate portion 11 is bonded to the member such that the first water-repellent film 15 faces the hydrophilic film 24 (and second water-repellent film 25). In this step, an accommodating chamber 40 for enclosing a first liquid 41 and a second liquid 42 is formed in the liquid iris 10.

Next, an antireflection film (not shown) is formed on a desired surface (surface on the light-incident side or the light-emitting side) of the liquid iris 10 by a vapor deposition method or the like (Step S9). For example, a multilayered antireflection film in which low-refractive index layers and high-refractive index layers are alternately stacked may be used as the antireflection film. For example, the antireflection film is formed of $LaTiO_3/SiO_2$ films or the like, and the thickness thereof is, for example, about 400 nm.

Next, the first liquid 41 and the second liquid 42 are injected into the accommodating chamber 40 from an inlet 32a provided through the sidewall member 32 using a syringe or the like (Step S10). In this step, first, a predetermined amount of second liquid 42 is injected into the accommodating chamber 40, and the first liquid 41 is then filled in the remaining space in the accommodating chamber 40. In this step, the first liquid 41 and the second liquid 42 are filled so that air does not remain in the accommodating chamber 40. The ratio of the amount of first liquid 41 injected to the amount of second liquid 42 injected is appropriately adjusted in accordance with the degree of wettability of the second liquid 42 on the hydrophilic films 24 and 33, the degree of wettability of the first liquid 41 on the first water-repellent film 15 and the second water-repellent film 25, the diameter of the second water-repellent film 25 etc.

Next, the first electrode 13 and the second electrode 23 are connected to the power supply 8 (Step S11). Lastly, for example, a UV-curable adhesive (adhesive member 34) is applied onto the sidewall member 32, and the adhesive is then cured by ultraviolet irradiation to seal the inlet 32a of the sidewall member 32 (Step S12). Accordingly, the accommodating chamber 40 is hermetically sealed to seal the first liquid 41 and the second liquid 42 therein. As described above, the liquid iris 10 is produced in this embodiment.

[Operation of Liquid Iris]

Before a description of an operation of the liquid iris 10 of this embodiment when a voltage is applied thereto, an electrowetting phenomenon (electrocapillarity) will be briefly described.

Figure 6A:
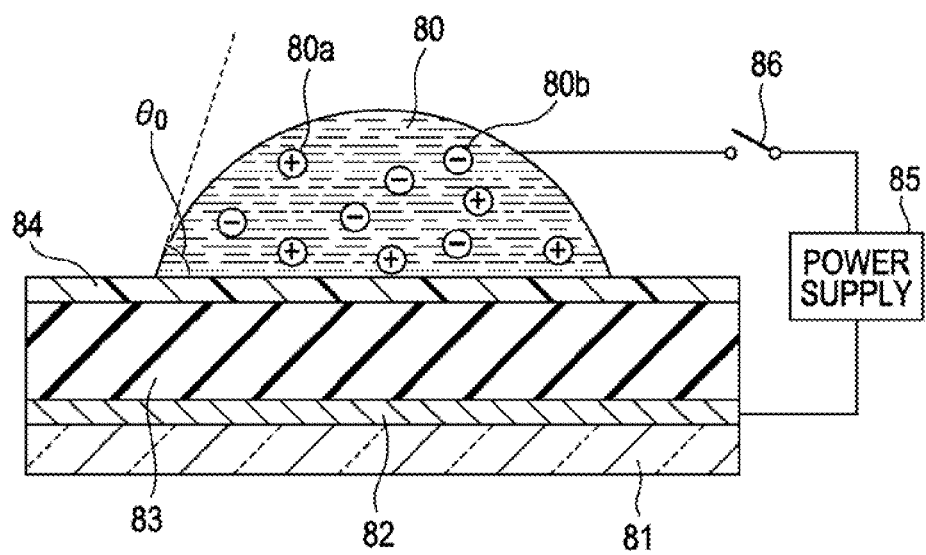
FIG. 6A is a view showing a state of a polar liquid before a voltage is applied to the polar liquid.
Figure 6B:
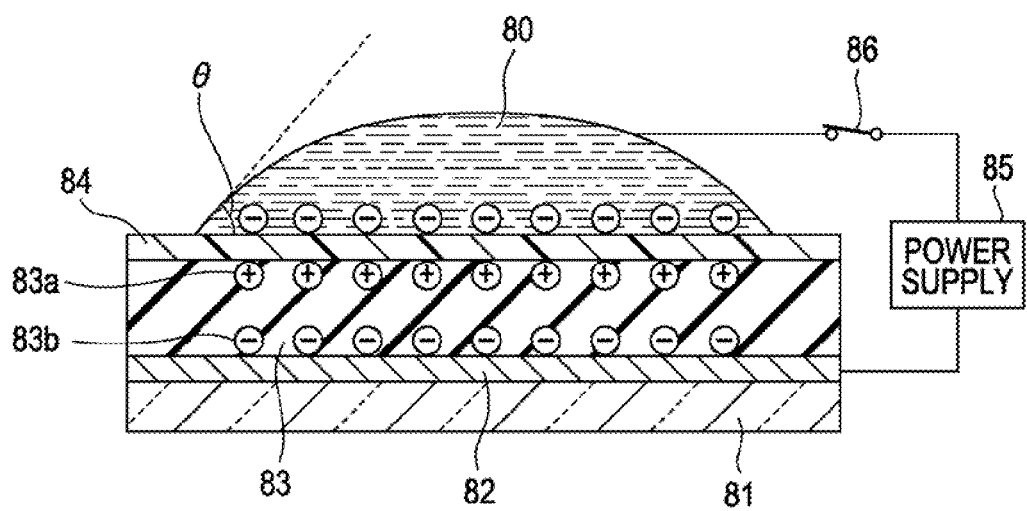
FIG. 6B is a view showing a state of the polar liquid when a voltage is applied to the polar liquid.

FIGS. 6A and 6B are views showing the principle of the electrowetting phenomenon. FIG. 6A is a view showing a state of a polar liquid 80 when no voltage is applied to the polar liquid 80, and FIG. 6B is a view showing a state of the polar liquid 80 when a voltage is applied to the polar liquid 80.

In the example shown in FIGS. 6A and 6B, a member includes a substrate 81, an electrode 82 disposed on the substrate 81, an insulating film 83 disposed on the electrode 82, and a water-repellent film 84 (hydrophobic film) disposed on the insulating film 83. It is assumed that a polar liquid 80 (e.g., water) is dropped on the water-repellent film 84. The polar liquid 80 is connected to a terminal of a power supply 85 through a switch 86, and another terminal of the power supply 85 is connected to the electrode 82. In this example, as shown in FIG. 6A, positive ion-molecules 80a and negative ion-molecules 80b are present in the polar liquid 80.

When no voltage is applied to the polar liquid 80 (when the switch 86 is in the off-state), the surface of the polar liquid 80 becomes spherical (the state shown in FIG. 6A) because of the surface tension. In this case, the angle formed by the surface of the water-repellent film 84 and the portion of the liquid surface of the polar liquid 80 that is in contact with the water-repellent film 84, that is, the contact angle is represented by $\theta_0$.

When the switch 86 is closed and a voltage is applied to the polar liquid 80, positive charges 83a are generated on a surface of the insulating film 83 and negative charges 83b are generated on another surface thereof. In the example shown in FIGS. 6A and 6B, the positive charges 83a are generated on the polar liquid 80 side of the insulating film 83, and the negative charges 83b are generated on the electrode 82 side of the insulating film 83. In this case, an electrostatic force acts on the negative ion-molecules 80b of the polar liquid 80, and the negative ion-molecules 80b are attracted to the water-repellent film 84 on the insulating film 83. As a result, the polar liquid 80 adheres to the water-repellent film 84 in a spread-out manner (the state shown in FIG. 6B), as compared with the case where no voltage is applied (the state shown in FIG. 6A). The contact angle θ of the polar liquid 80 at that time becomes smaller than the contact angle $\theta_0$ when no voltage is applied. Specifically, the wettability of the polar liquid 80 on the water-repellent film 84 (i.e., affinity between the polar liquid 80 and the water-repellent film 84) is increased by applying the voltage. This phenomenon is referred to as an electrowetting phenomenon.

In this embodiment, the shape of the interface between the first liquid 41 and the second liquid 42 enclosed in the liquid iris 10 is changed by utilizing the above-described electrowetting phenomenon to perform the aperture operation of the liquid iris 10.

Figure 7A:
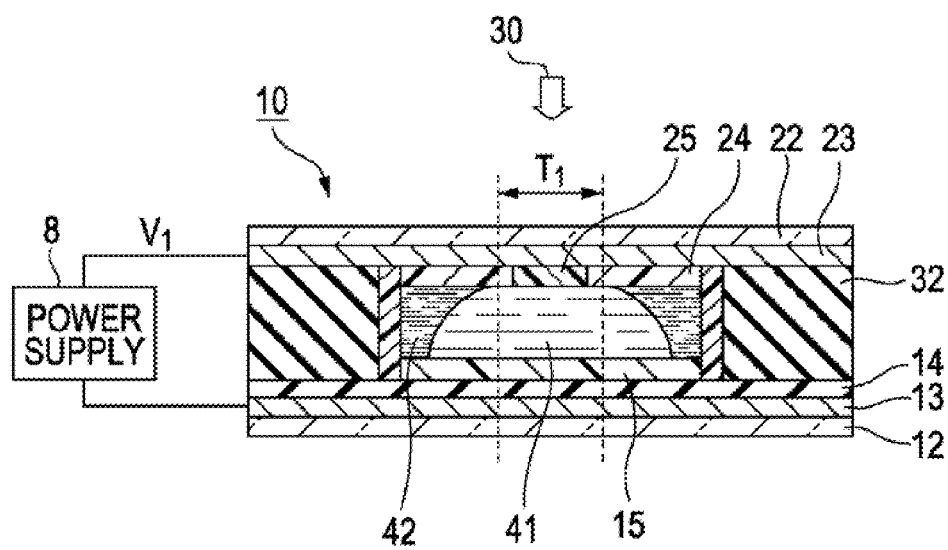
FIG. 7A is a schematic cross-sectional view of a liquid iris when a voltage is applied.
Figure 7B:
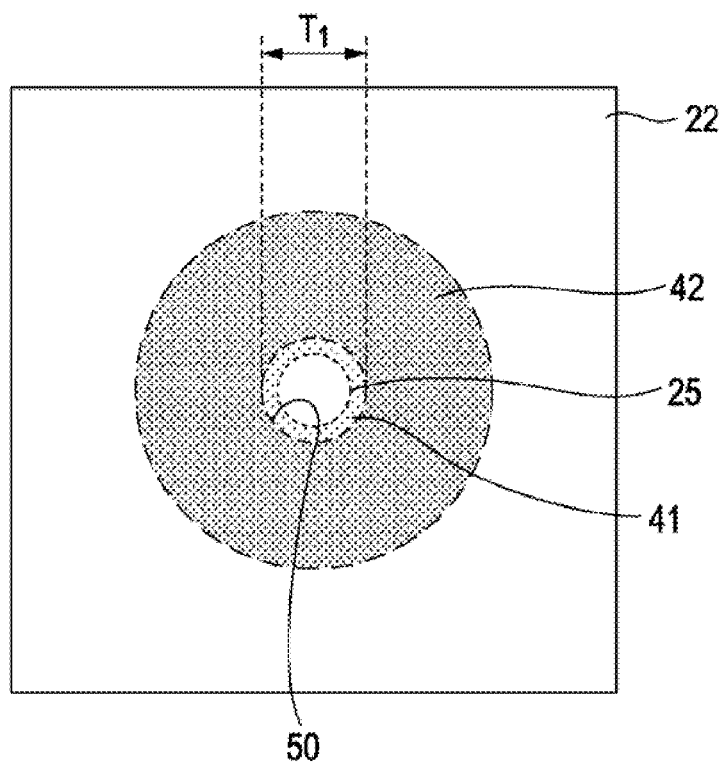
FIG. 7B is a top view of the liquid iris shown in FIG. 7A, viewed from the light-incident side when the voltage is applied.

FIGS. 7A and 7B show the state of the operation of the liquid iris 10 when a voltage $V_1$ is applied between the first electrode 13 and the second electrode 23. FIG. 7A is a cross-sectional view of the liquid iris 10 when the voltage $V_1$ is applied, and FIG. 7B is a top view of the liquid iris 10 viewed from the light-incident side at that time. When the voltage $V_1$ is applied between the first electrode 13 and the second electrode 23, the first liquid 41 is further pressed onto films on the second substrate portion 21 side through an electrowetting phenomenon. Consequently, a contact area between the first liquid 41 and the films on the second substrate portion 21 side, i.e., the diameter of a circular opening 50 formed on the light-incident side of the liquid iris 10 increases. For example, in the example shown in FIGS. 7A and 7B, when the voltage $V_1$ is applied, the diameter of the opening 50 becomes $T_1$, which is larger than the diameter of the opening 50 in the static state (see FIG. 2B).

Figure 8:
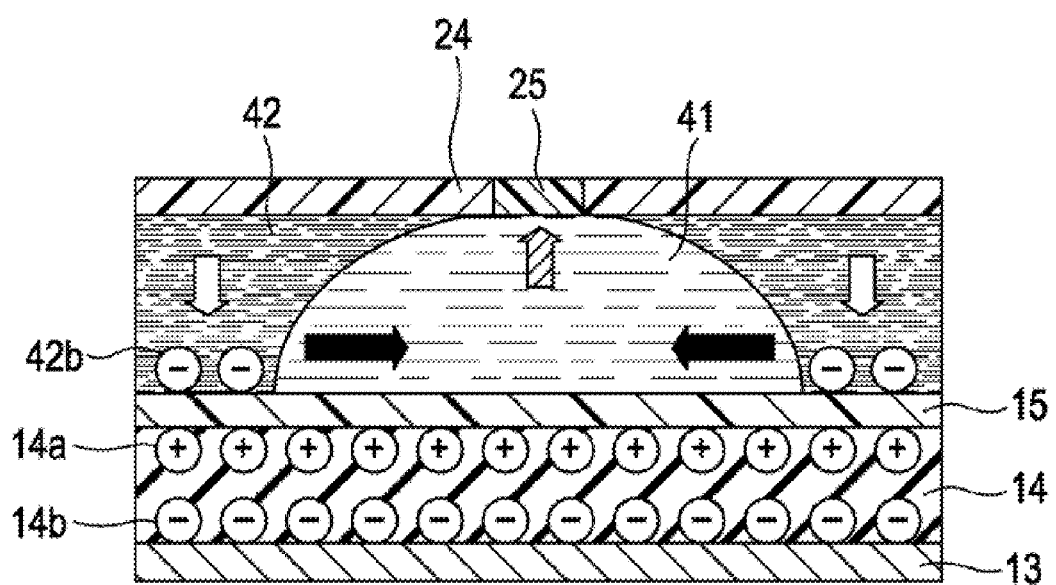
FIG. 8 is a view showing the principle of an operation of the liquid iris.

With reference to FIG. 8, a description will be made of the principle that when a voltage is applied between the first electrode 13 and the second electrode 23, the contact area between the first liquid 41 and the films on the second substrate portion 21 side increases. FIG. 8 is a view showing the principle of an operation when a voltage is applied to the liquid iris 10. In FIG. 8, a description will be made of an example in which positive charges 14a are generated on the liquid side of the insulating film 14, and negative charges 14b are generated on the first electrode 13 side of the insulating film 14.

When a voltage is applied between the first electrode 13 and the second electrode 23, positive charges 14a are generated on the liquid side of the insulating film 14. In this case, an electrostatic force acts on the negative ion-molecules 42b in the second liquid 42, which is a polar liquid, and the negative ion-molecules 42b are attracted to the first water-repellent film 15 side (as shown by the white arrows in FIG. 8). In this case, the second liquid 42 is made to spread over the first water-repellent film 15 through the electrowetting phenomenon. Consequently, a pushing force (shown by the black arrows in FIG. 8) acts to the first liquid 41 from the second liquid 42, which is present around the first liquid 41. Accordingly, the surface shape of the first liquid 41 on the hydrophilic film 24 side is changed so as to be pushed toward the hydrophilic film 24 side (as shown by the hatched arrow in FIG. 8). As a result, a part of the surface of the first liquid 41 on the hydrophilic film 24 side is pressed onto the films on the hydrophilic film 24 side. As a result, the contact area between the first liquid 41 and the films on the second substrate portion 21 side increases, thus increasing the diameter of the opening 50 formed on the light-incident side (hydrophilic film 24 side) of the liquid iris 10.

Figure 9A:
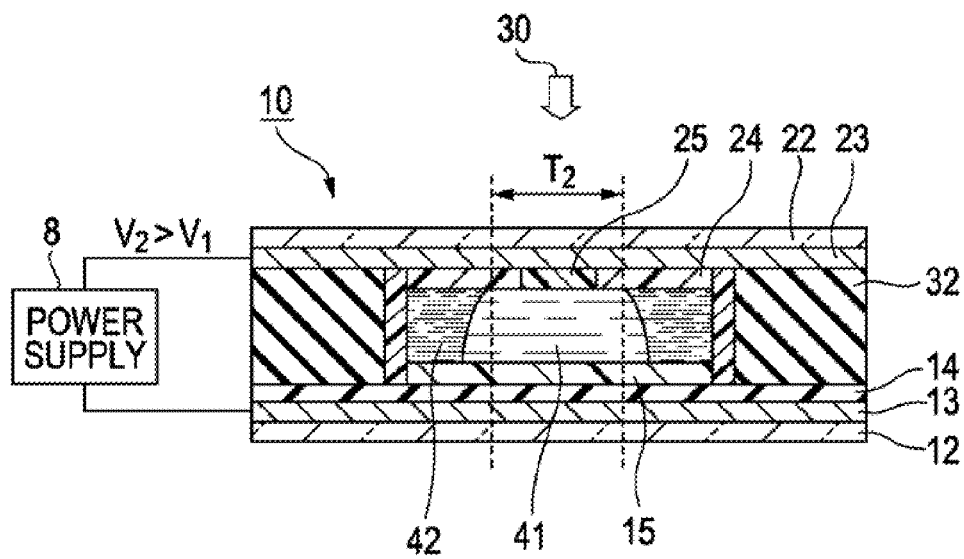
FIG. 9A is a schematic cross-sectional view of the liquid iris when a voltage is applied.
Figure 9B:
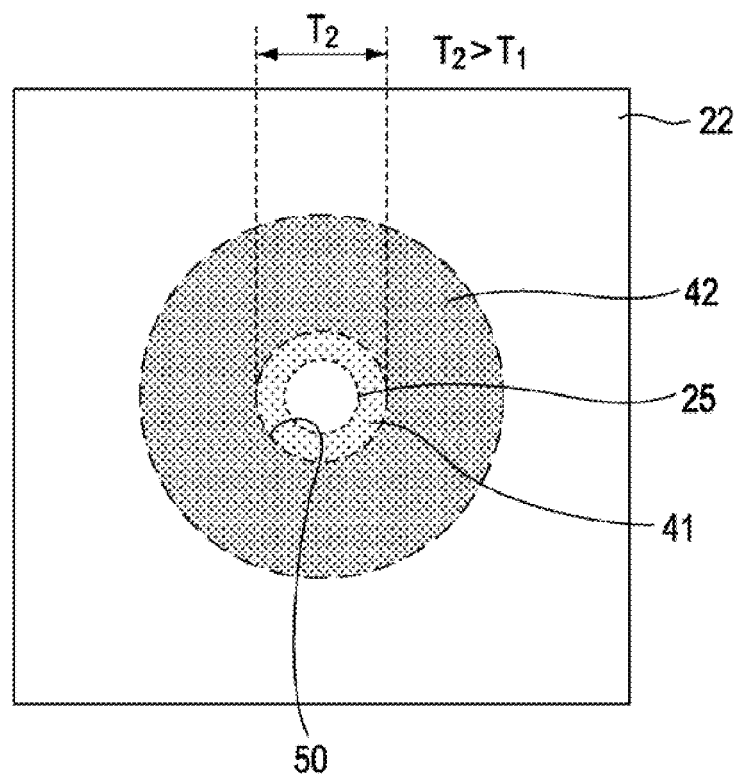
FIG. 9B is a top view of the liquid iris shown in FIG. 9A, viewed from the light-incident side when the voltage is applied.

Furthermore, when the voltage applied between the first electrode 13 and the second electrode 23 is increased, the second liquid 42 is made to further spread over the first water-repellent film 15 through the electrowetting phenomenon. Accordingly, the pushing force (shown by the black arrows in FIG. 8) acting from the second liquid 42 to the first liquid 41 further increases, and the shape of the surface of the first liquid 41 on the hydrophilic film 24 side is changed so as to be further pushed to the hydrophilic film 24 side. Specifically, an angle of inclination formed between the first water-repellent film 15 and the interface of the first liquid 41 and the second liquid 42 further increases. In this case, the contact area between the first liquid 41 and the films on the hydrophilic film 24 side further increases, thereby further increasing the diameter of the opening 50. FIGS. 9A and 9B show this state.

FIG. 9A is a cross-sectional view of the liquid iris 10 when a voltage $V_2$ ($>V_1$) is applied between the first electrode 13 and the second electrode 23, and FIG. 9B is a top view of the liquid iris 10 viewed from the light-incident side at that time. When the voltage applied between the first electrode 13 and the second electrode 23 is increased from $V_1$ to $V_2$, the diameter of the opening 50 formed on the light-incident side of the liquid iris 10 is also increased from $T_1$ to $T_2$.

As described above, in the liquid iris 10 of this embodiment, a part of the first liquid 41 is fixed to the second water-repellent film 25 provided at the center of the hydrophilic film 24 in the static state. Accordingly, the opening 50 formed during the application of a voltage expands centering on the second water-repellent film 25. That is, even during the application of a voltage, a shift (decentration) of the center of the opening 50 formed on the light-incident side from the optical axis does not occur. Consequently, according to this embodiment, decentration can be suppressed even during the application of a voltage, thus suppressing a decrease in the resolution.

Second Embodiment

In a second embodiment, a description will be made of an example in which the structure of the first electrode is changed in the structure of the liquid iris 10 of the first embodiment.

[Structure of Imaging Device]

Figure 10A:
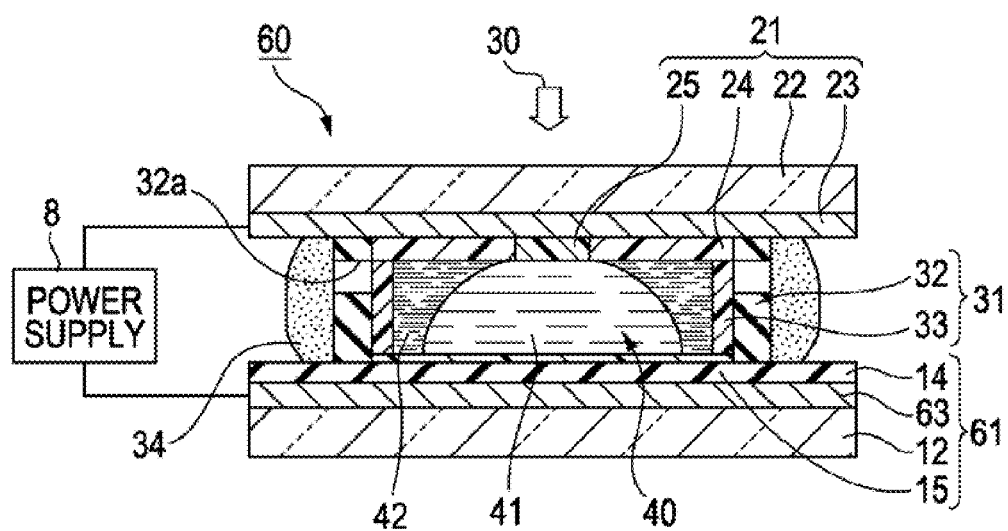
FIG. 10A is a schematic cross-sectional view of a liquid iris according to a second embodiment.
Figure 10B:
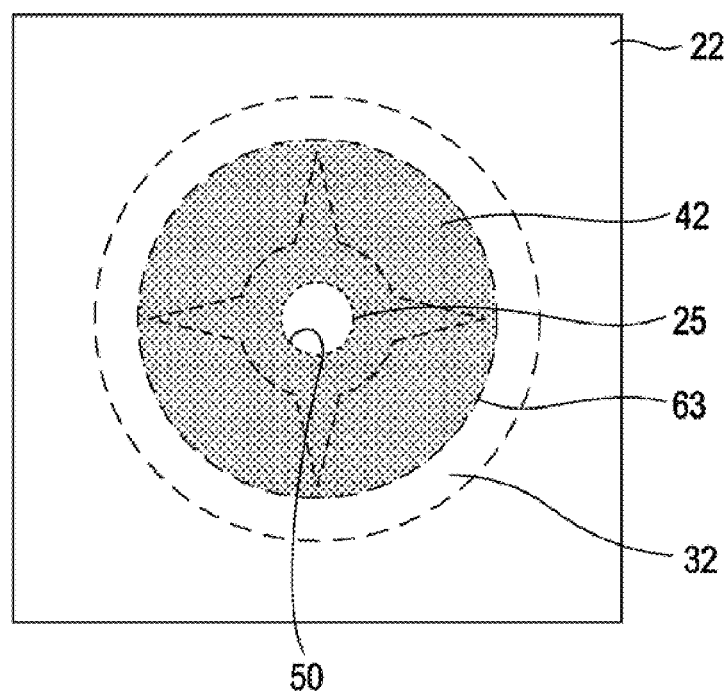
FIG. 10B is a top view of the liquid iris shown in FIG. 10A, viewed from the light-incident side.

FIGS. 10A and 10B are schematic views of a liquid iris of this embodiment. FIG. 10A is a cross-sectional view of a liquid iris 60 when no voltage is applied. FIG. 10B is a top view of the liquid iris 60 viewed from the incident side of a light beam 30 at that time. In the liquid iris 60 shown in FIGS. 10A and 10B, the same components as those of the liquid iris 10 (shown in FIGS. 2A and 2B) of the first embodiment are assigned the same reference numerals.

The liquid iris 60 includes a first substrate portion 61, a second substrate portion 21, and a sidewall portion 31 that connects the first substrate portion 61 to the second substrate portion 21. A first liquid 41 and a second liquid 42 are hermetically sealed in an accommodating chamber 40 constituted by the first substrate portion 61, the second substrate portion 21, and the sidewall portion 31.

The structure of the liquid iris 60 of this embodiment is the same as that of the liquid iris 10 of the first embodiment except that the structure of a first electrode 63 of the first substrate portion 61 is changed. Therefore, a description of the structure other than the first electrode 63 is omitted here.

Figure 11:
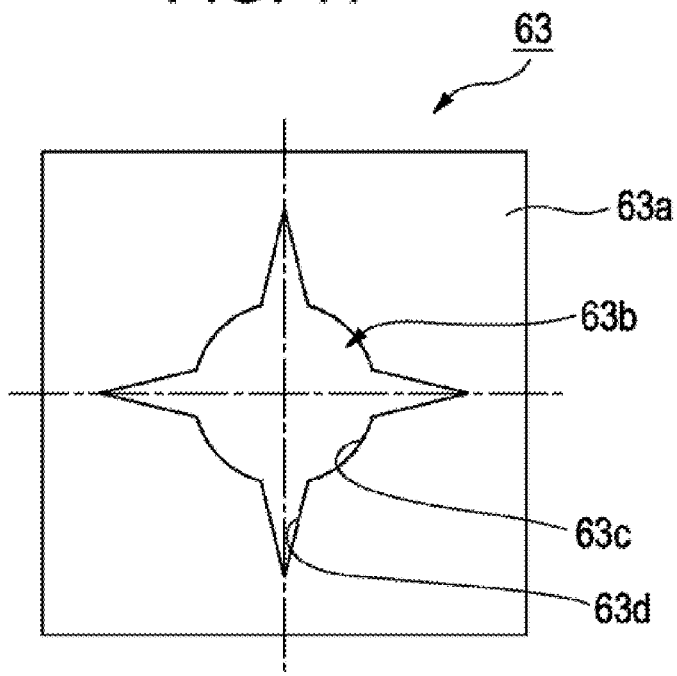
FIG. 11 is a view showing a first electrode of the second embodiment.

FIG. 11 shows a schematic structure of the first electrode 63 used in this embodiment. An electrode opening 63b is provided at the center of an electrode portion 63a of the first electrode 63. The electrode portion 63a of the first electrode 63 is composed of the same material as the first electrode 13 of the first embodiment and has the same thickness as that of the first electrode 13 thereof. A first substrate 12 on which the first electrode 63 is provided is exposed at the electrode opening 63b.

The electrode opening 63b is a star-shaped opening. The electrode opening 63b in this embodiment includes a circular portion 63c disposed at the center of the first electrode 63 and four projecting portions 63d. The projecting portions 63d are separately disposed around the circumference of the circular portion 63c at intervals of 90 degrees, and each project from the circumference toward the outside in the shape of an inverted-V character.

The electrode opening 63b can be formed (patterned) as follows. First, the first electrode 63 is formed over the entire surface of the first substrate 12 as in the first embodiment (Step S1 in FIG. 5). Next, a portion of the first electrode 63 corresponding to the electrode opening 63b is removed by a wet-etching method or the like to form the electrode opening 63b. Alternatively, a portion of the first substrate 12 corresponding to the electrode opening 63b is masked, and the first electrode 63 may then be formed on the first substrate 12. The liquid iris 60 of this embodiment can be prepared as in the first embodiment except that the electrode opening 63b is formed as described above.

[Principle of Suppressing Decentration]

Figure 12:
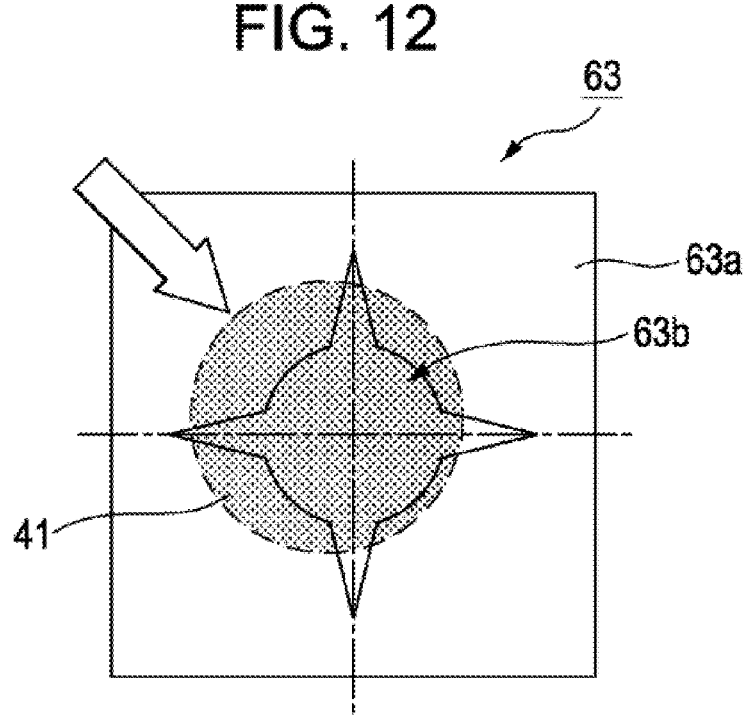
FIG. 12 is a view showing the principle of a decentration control by the first electrode.

FIG. 12 is a view showing the principle of suppressing decentration of an opening when the star-shaped electrode opening 63b is formed at the center of the first electrode 63. When the position of the first liquid 41 (insulating transparent liquid) is shifted (decentered) from the center of the first electrode 63 on the first electrode 63 as shown in FIG. 12, an area where the first liquid 41 overlaps the electrode portion 63a becomes nonuniform (i.e., the symmetry of the area is lost).

When a voltage is applied to the liquid iris 60 in such a state, the balance of the pushing forces acting from the second liquid 42 to the first liquid 41 due to an electrowetting phenomenon is disrupted. In this case, a force to balance the pushing forces, i.e., a restoration force (shown by the white arrow in FIG. 12) for returning the first liquid 41 to the center of the first electrode 63 acts on the first liquid 41. Accordingly, in this embodiment, the restoration force acts during application of a voltage so that the first liquid 41 is located at the center of the first electrode 63, and thus decentration of the opening can be suppressed. Accordingly, in this embodiment, the effect of suppressing decentration on the first electrode 63 (on the first water-repellent film 15) can be further increased.

[Other Examples of First Electrode]

The shape of the electrode opening 63b of the first electrode 63 is not limited to the star shape shown in FIG. 11. As for the star shape of the electrode opening, a plurality of projections projecting from the center to the outside are arranged in a direction around the center of the first electrode at substantially the same distance from each other (substantially the same interval). FIGS. 13 to 17 show examples of an electrode opening having a star shape other than the shape shown in FIG. 11.

Figure 13:
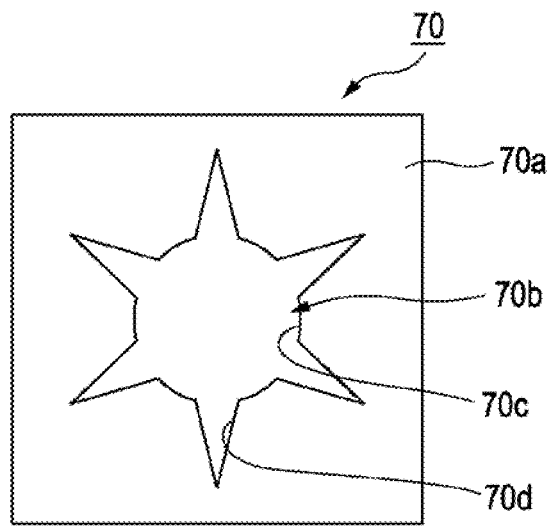
FIG. 13 is a view showing an example of the first electrode.

In the example shown in FIG. 13, an electrode opening 70b includes a circular portion 70c disposed at the center of a first electrode 70 and six projecting portions 70d. The projecting portions 70d are separately disposed around the circumference of the circular portion 70c at intervals of 60 degrees, and each project from the circumference toward the outside in the shape of an inverted-V character.

Figure 14:
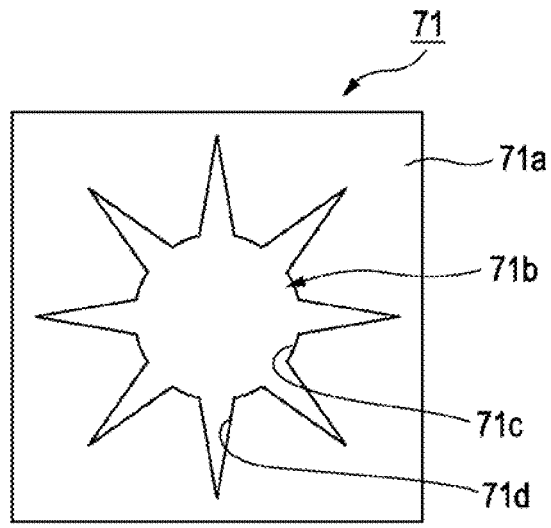
FIG. 14 is a view showing an example of the first electrode.

In the example shown in FIG. 14, an electrode opening 71b includes a circular portion 71c disposed at the center of a first electrode 71 and eight projecting portions 71*d*. The projecting portions 71*d* are separately disposed around the circumference of the circular portion 71*c* at intervals of 45 degrees, and each project from the circumference toward the outside in the shape of an inverted-V character.

Figure 15:
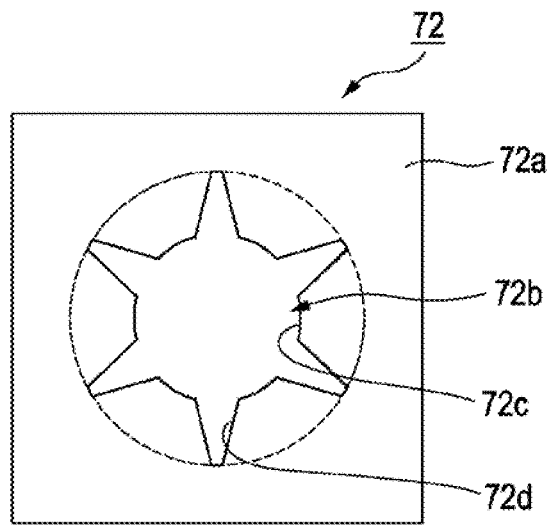
FIG. 15 is a view showing an example of the first electrode.

In the example shown in FIG. 15, an electrode opening 72*b* includes a circular portion 72*c* disposed at the center of a first electrode 72 and six projecting portions 72*d*. The projecting portions 72*d* are separately disposed around the circumference of the circular portion 72*c* at intervals of 60 degrees, and each project from the circumference toward the outside in the shape of an inverted-V character. In this example shown in FIG. 15, the leading end of each of the projecting portions 72*d* has a circular arc shape concentric with the circular portion 72*c*.

Figure 16:
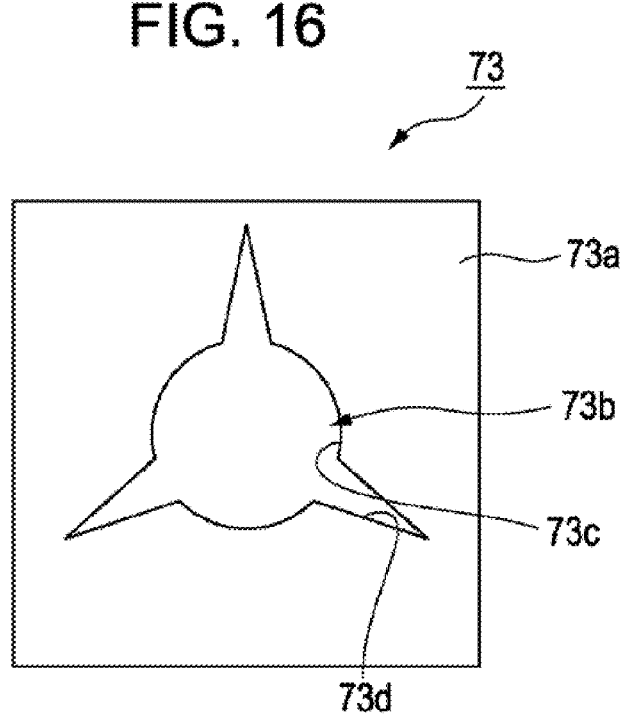
FIG. 16 is a view showing an example of the first electrode.

In the example shown in FIG. 16, an electrode opening 73*b* includes a circular portion 73*c* disposed at the center of a first electrode 73 and three projecting portions 73*d*. The projecting portions 73*d* are separately disposed around the circumference of the circular portion 73*c* at intervals of 120 degrees, and each project from the circumference toward the outside in the shape of an inverted-V character.

Figure 17:
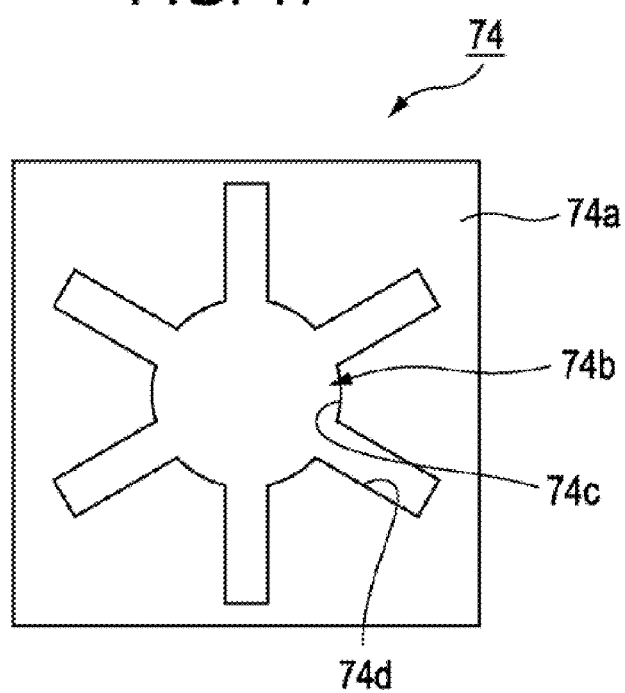
FIG. 17 is a view showing an example of the first electrode.

In the example shown in FIG. 17, an electrode opening 74*b* includes a circular portion 74*c* disposed at the center of a first electrode 74 and six rectangular projecting portions 74*d* each having a uniform width. The projecting portions 74*d* are separately disposed around the circumference of the circular portion 74*c* at intervals of 60 degrees, and each project from the circumference toward the outside.

The electrode opening of the first electrode may have any shape as long as when the first liquid 41 is located at the center of the first electrode, an area where the first liquid 41 overlaps the electrode portion is symmetric with respect to the center of the first electrode.

In the embodiments described above, examples in which a second electrode 23 composed of a transparent electrode film is provided on a second substrate 22 have been described, but the present application is not limited thereto. For example, as in document '792, a rod-shaped electrode may be used as the second electrode. In such a case, the rod-shaped electrode is inserted from the sidewall portion, and an end of the rod-shaped electrode is directly in contact with the second liquid 42. In such a case, the hydrophilic film 24 and the second water-repellent film 25 are formed directly on the second substrate 22.

In the embodiments described above, a description has been made of examples in which the present application is applied to a liquid iris, but the present application is not limited thereto. The present application can be applied also to an optical element such as a shutter or a lens. However, when the present application is applied to a lens, both the first liquid 41 and the second liquid 42 are constituted by transparent liquids, and liquids having refractive indices different from each other are used as the first liquid 41 and the second liquid 42.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An optical element comprising:
a first liquid;
a second liquid that is immiscible with the first liquid and that has polarity or electrical conductivity;
a first substrate portion including
a first substrate having optical transparency,
a first electrode disposed on a surface of the first substrate and having optical transparency,
an insulating film disposed on the first electrode and having optical transparency, and
a first film disposed on the insulating film and having higher affinity with the first liquid than with the second liquid and optical transparency;
a second substrate portion including
a second substrate having optical transparency,
a second film disposed on a surface of the second substrate and having higher affinity with the second liquid than with the first liquid and optical transparency, and
a third film disposed at the center of the second film and having higher affinity with the first liquid than with the second liquid and optical transparency;
a sidewall portion connecting the first substrate portion to the second substrate portion so that the first film and the second film face each other;
a second electrode disposed on one of the second substrate portion and the sidewall portion; and
an accommodating portion constituted by the first substrate portion, the second substrate portion, and the sidewall portion and sealing the first liquid and the second liquid therein.

2. The optical element according to claim 1, wherein the light transmittance of the first liquid is higher than the light transmittance of the second liquid, and the refractive index of the first liquid is the same as the refractive index of the second liquid.

3. The optical element according to claim 1, wherein the surface of the third film at the accommodating portion side is circular in shape.

4. The optical element according to claim 1, wherein the thickness of the second film is the same as the thickness of the third film.

5. The optical element according to claim 1, wherein a star-shaped opening is provided at the center of the first electrode.

6. The optical element according to claim 1, wherein the second electrode has optical transparency and is disposed between the second substrate and the second film.

7. The optical element according to claim 1, further comprising:
a fourth film disposed on a surface of the sidewall portion, the surface being adjacent to the accommodating portion, and having higher affinity with the second liquid than with the first liquid.

8. An imaging device comprising:
an optical element including
a first liquid,
a second liquid that is immiscible with the first liquid and that has polarity or electrical conductivity,
a first substrate portion including
a first substrate having optical transparency,
a first electrode disposed on a surface of the first substrate and having optical transparency,
an insulating film disposed on the first electrode and having optical transparency, and
a first film disposed on the insulating film and having higher affinity with the first liquid than with the second liquid and optical transparency,
a second substrate portion including
a second substrate having optical transparency, a second film disposed on a surface of the second substrate and having higher affinity with the second liquid than with the first liquid and optical transparency, and a third film disposed at the center of the second film and having higher affinity with the first liquid than with the second liquid and optical transparency, a sidewall portion connecting the first substrate portion to the second substrate portion so that the first film and the second film face each other, a second electrode disposed on one of the second substrate portion and the sidewall portion; and an accommodating portion constituted by the first substrate portion, the second substrate portion, and the sidewall portion and sealing the first liquid and the second liquid therein;

a power supply unit configured to apply a voltage between the first electrode and the second electrode of the optical element;

a lens unit configured to focus incident light; and an imaging element on which the light is focused through the optical element and the lens unit.

* * * * *